3 Sheets—Sheet 1

J. P. MANTON & G. H. REMINGTON.

Assignors to the AMERICAN SHIP-WINDLASS Co.

Power-Capstan.

No. 8,001. Reissued Dec. 18, 1877.

WITNESSES.

L. P. Langworthy.

C. S. Larkin

INVENTORS.

Joseph P. Manton

Geo. H. Remington by Joseph A. Miller, Attorney.

THE NORRIS PETERS CO., PHOTO-LITHO., WASHINGTON, D. C.

3 Sheets—Sheet 2.

J. P. MANTON & G. H. REMINGTON.

Assignors to the AMERICAN SHIP-WINDLASS CO.

Power-Capstan.

No. 8,001. Reissued Dec. 18, 1877.

WITNESSES.

L. P. Langworthy

C. S. Larkin

INVENTORS.

Joseph P. Manton

Geo H. Remington by Joseph A. Miller
attorney

THE NORRIS PETERS CO., PHOTO-LITHO., WASHINGTON, D. C.

J. P. MANTON & G. H. REMINGTON.

Assignors to the AMERICAN SHIP-WINDLASS Co.

Power-Capstan.

No. 8,001. Reissued Dec. 18, 1877.

WITNESSES.

L. P. Langworthy.

C. S. Larkin

INVENTORS.

Joseph P. Manton

Geo. H. Remington by Joseph A. Miller
Attorney

THE NORRIS PETERS CO., PHOTO-LITHO., WASHINGTON, D. C.

UNITED STATES PATENT OFFICE.

JOSEPH P. MANTON AND GEORGE H. REMINGTON, OF PROVIDENCE, RHODE ISLAND, ASSIGNORS TO THE AMERICAN SHIP WINDLASS COMPANY.

IMPROVEMENT IN POWER-CAPSTANS.

Specification forming part of Letters Patent No. 155,877, dated October 13, 1874; Reissue No. 8,001, dated December 18, 1877; application filed September 17, 1877.

*To all whom it may concern:*

Be it known that we, JOSEPH P. MANTON and GEORGE H. REMINGTON, both of the city and county of Providence, State of Rhode Island, have invented a new and useful Improvement in Power-Capstans; and we do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
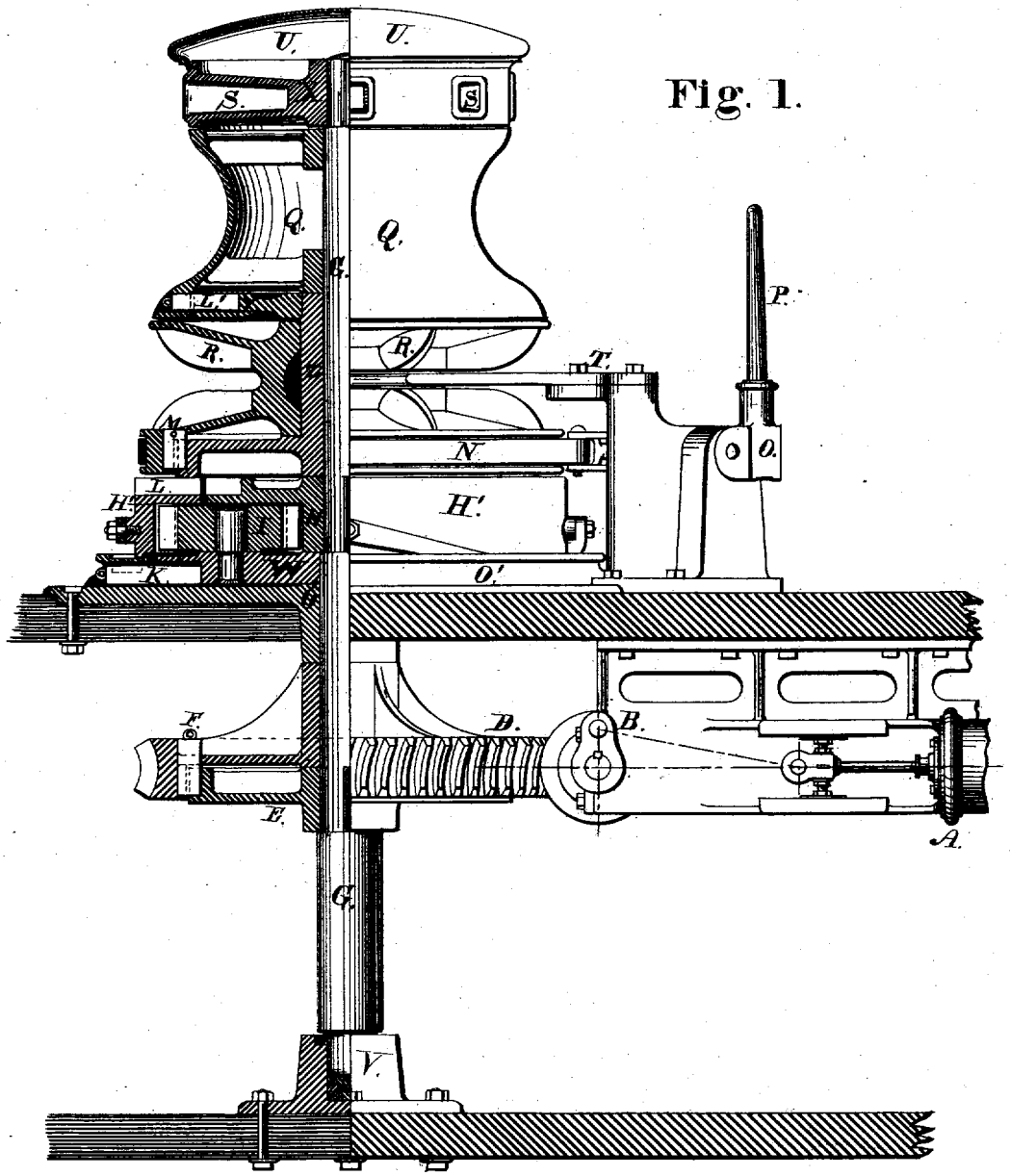
Figure 2:
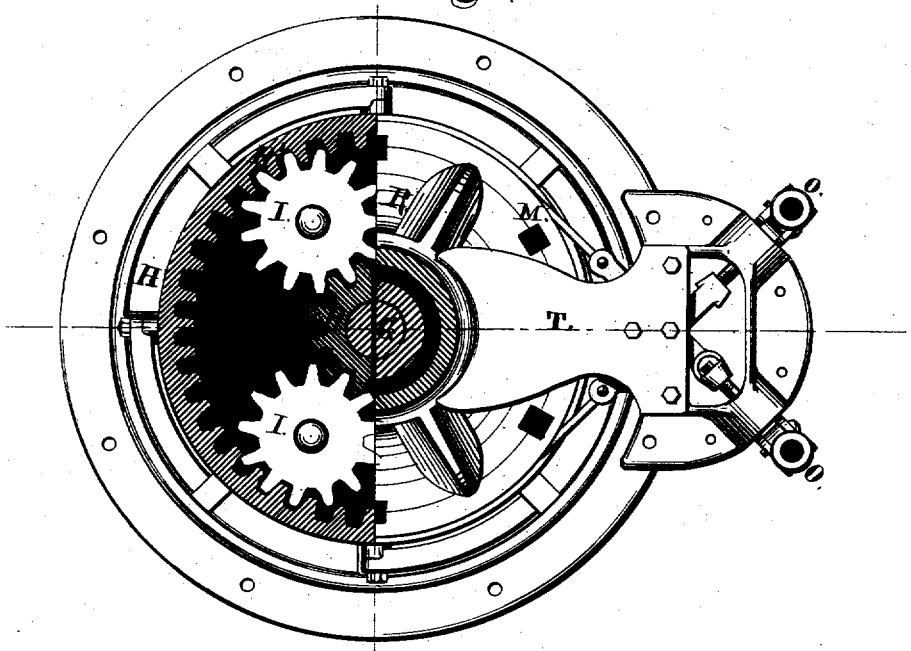
Figure 3:
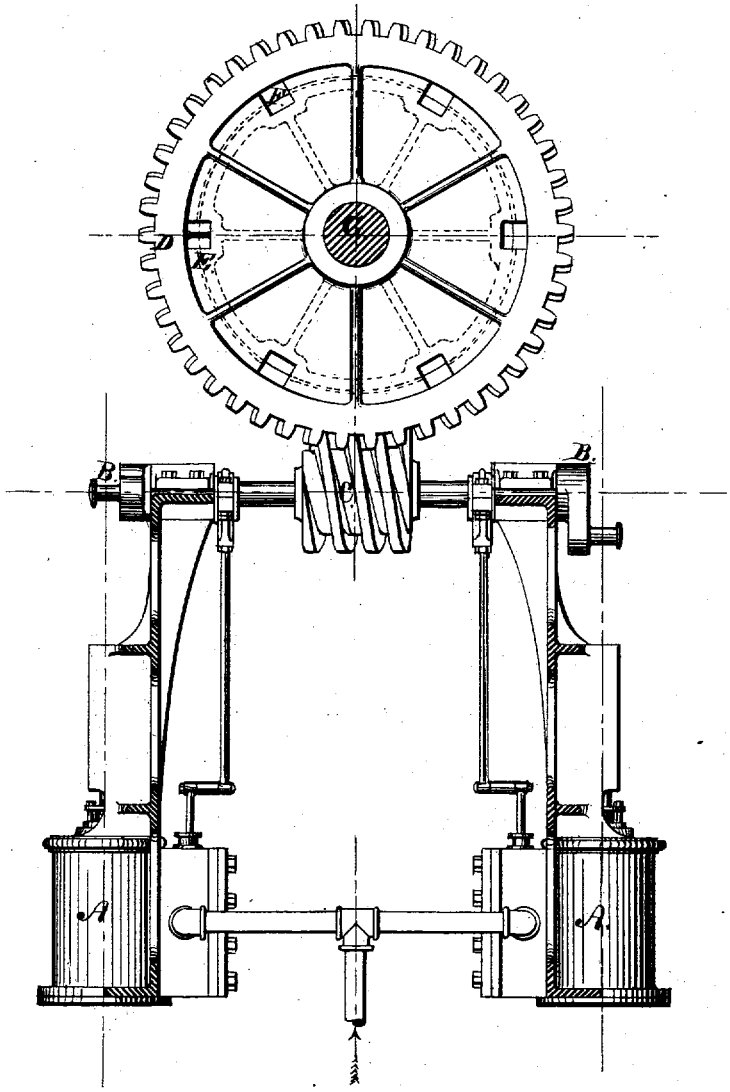

Figure 1 is an elevation of our improved capstan, partly in view and partly in section, showing the relative positions of the engines A A, the worm C, the worm-gear D, the driving-head E, and their relation to the shaft G, as also the position of the capstan-head X, the barrel Q, the wild-cat R, the friction-brake N, with the central shaft G. Fig. 2 is a horizontal section, showing the power-gear I in section, and the wild-cat R partly in view. Fig. 3 shows the arrangement of the engines, with the worm C, worm-gear D, and the driving-head E, and their relation to the shaft G.

The object of the invention is to so construct a capstan or windlass that the same can be worked by hand-power in the usual manner, and also driven by steam-power, which can be readily connected with or disconnected from the same.

Our invention consists, first, in the application to a capstan or windlass of a worm and worm-gear, arranged so that the capstan or windlass may be operated in the usual manner and with increased power through the worm and worm-gear.

It further consists in the application of engine-power to a capstan or windlass through a worm and worm-gear, arranged so that the engine-power may be readily connected with and disconnected from the capstan or windlass, and the same be operated by either the usual hand-power or the engine-power.

It also consists in the peculiar combination and arrangement of the parts, so that by a simple manipulation the engine-power may be applied to the barrel or wild-cat, or to both, and, also, the compound gear may be readily applied to either, and so the power increased; that the whole may be operated by hand in the usual manner, and both by hand or engine power, in either direction.

In the drawings, X represents the capstan-head, furnished with socket-holes S for the insertion of the capstan-bars. This capstan-head X is permanently keyed on the shaft G. Next to and below the capstan-head is the capstan-barrel Q, fitting the shaft G, but turning freely on the same. Below this is the wild-cat R, which turns freely upon the sleeve Z, encompassing the shaft G, and also turning freely on the same. To the upper end of the sleeve Z a disk-plate, Y, is secured, having locking-sockets corresponding with a locking-socket in the capstan-barrel Q.

When, now, the key-block L′ is placed into the locking-socket at the base of the barrel, so as to engage in one of the sockets of the disk-plate Y, the sleeve Z and the capstan-barrel are firmly secured one to the other, and revolve together, but freely, around the shaft G.

Cast onto the lower end of the sleeve Z and forming part of the same is a circular disk-plate, having a number of locking-sockets, some in the top part of the same, to receive the key-block M, and others in the periphery, to correspond with the locking-socket L.

When, now, the locking-socket in the base of the wild-cat R, the key-block L′ being still in place at the base of the barrel, it will be seen that, by means of the sleeve Z, the disk Y, and the key-blocks L′ and M, the capstan-barrel Q, the wild-cat R, and the sleeve Z are firmly secured together, but are still free to revolve on the shaft G, and not affected by the revolving of the capstan-head X or the shaft, while both are under complete control of the friction-brake N, the brake-surface forming the lower rim of the wild-cat, surrounded by the friction-strap N, which can be operated by either or both of the two eccentric-levers O and handspikes P.

The toothed gear-wheel H is cast in one piece with the circular disk, containing locking-sockets corresponding with the locking-socket L, and is firmly keyed or secured to the shaft G, and revolves with the same.

If, now, the key-block is placed into the socket L, the wild-cat R, the barrel Q, and capstan-head X are all firmly secured to the shaft G, and, when the capstan-head is turned by the capstan-bars in either direction, the whole will turn with the capstan-head. If, now, the key-block L′ is removed, the barrel will be loose and turn freely, while the wild-cat is still secured to the shaft G, and will only turn with the capstan-head X. If, however, instead of the key-block L′ the key-block M is removed, the barrel Q will remain firmly attached to the shaft G, and move with the same, while the wild-cat R may freely revolve on the sleeve Z.

The base of the capstan consists of the circular plate marked in the drawing O′, which is firmly secured to the deck, and which forms the journal or bolster of the shaft G. This base-plate has a rim projecting above the deck, in which a locking-socket is made at K. Resting on this base-plate, and surrounding the shaft G, on which it turns freely, is the disk-plate W, carrying the intermediate pinions I, which are secured to said plate by studs, on which they turn, and gear into the toothed pinion H, and also into the toothed rim H′.

When, now, the key-block L is removed and placed in the locking-socket K, the disk-plate W is secured to the base-ring O′, and cannot revolve around the shaft G or with the same. The toothed gear H, therefore, revolving with the shaft, turns the intermediate pinions I on their studs, and they, in turning, engaging into the toothed rim H′, turn the same; and this being cast in one piece with the sleeve Z, or firmly secured to the same, turns the capstan-barrel and wild-cat both together, or either separate, as may be desired, with increased power, at a slower speed than the capstan-head, and in the opposite direction.

All the above changes and operations are described as being done by hand-power, and the use of the capstan-bars placed into the sockets S in the capstan-head X. The same changes and operations may also, and as efficiently and more promptly, be performed by the application of engine-power, which we will now further describe.

A capstan and a windlass differ mainly in the position of the main shaft G, which, in a capstan, is vertical, and in a windlass horizontal; and as in many cases where a windlass is used below the deck the power is communicated through the capstan, we will describe the application of engine-power to a capstan.

The central shaft G extends below the deck, and rests in the step V. To this shaft and below the deck is firmly keyed the driving-head E, in the periphery of which a number of key-sockets are cast, as is shown in Fig. 3. Surrounding this driving-head, and turning freely on the shaft G, is the worm-gear D, having key-sockets corresponding with the key-sockets in the driving-head E.

When, now, the key-block F is placed as shown, so as to fit into both the sockets of the worm-wheel D and driving-head E, the capstan can be worked by the engines A A, the connecting-rods of which are secured to the cranks B B, and thus give rotary motion to the worm *c*, which engages into the worm-gear D, and so applies the power of the engines to the shaft G, and by this shaft, at the will of the operator, by simply inserting a key-block or removing one, all parts of the capstan can be driven by steam-power; and this power can be readily connected or disconnected, whether the shaft G is in a vertical position and forms the main shaft of a capstan, or in a horizontal position and forms the main shaft of a windlass, and a capstan or windlass can be driven in the usual manner by hand-power, and instantly converted into an engine-driven windlass or capstan.

Having thus described the relations of the different parts of our improved power-capstan, we will now explain the manipulations required to perform all the different functions by engine-power, premising first that when the key-block F is in its place our capstan is a direct engine-driven capstan, and when the key-block F is removed it is a hand-power capstan, all the change required being the replacing or removing of the key-block F. When a windlass is to be provided with this auxiliary power the shaft G occupies a horizontal position, and the driving-head E is secured to the same in the same manner as to the vertical shaft shown, and the worm-gear D is connected with or disconnected from the windlass by the key-block F, or in any other manner, by which the engine-power is connected to or disconnected from the capstan or windlass, so that the capstan or windlass may be driven by hand-power, in the usual manner, or by engine-power through a worm and worm-gear.

The advantage of connecting the engines with a capstan or windlass are:

First. The means for driving, as also the means for connecting and disconnecting, the engines, are simple in construction, consist of few parts, able to exert great power, and withstand wear and tear and the severest strains.

Second. To secure economic results in an engine, high piston speed is required. As the screw and screw-gear are the simplest means to reduce speed and increase the power, their application as an auxiliary to apply steam power to a capstan or windlass arranged to be operated by other means becomes of great importance in ships supplied with steam-power.

When a chain is to be hauled in by the capstan at full speed, the same is laid around the wild-cat, the key-block K is placed into the key-socket L, the key-block L′ being removed. Now, start the engines, and the wild-cat will haul the chain, and, if a double windlass, provided with two or more wild-cats, will haul in two or more chains either simultaneously or successively. If a rope is required to be hauled, the key-block L′ is replaced, and the barrel and wild-cat will move together, while both are controlled by the friction-brake.

When the key-blocks M, K, and F are removed, and the key-blocks L and L′ are in place, the capstan will be a simple hand-capstan, in which the capstan head and barrel revolve in either direction at the same speed.

When, now, the key-block M is inserted, we have a hand-capstan, the barrel, wild-cat, and capstan-head revolving together.

If, now, the key L is removed and placed into the key-socket K, we have a hand-power capstan, the barrel and wild-cat moving in a direction opposite to the direction of the capstan-head, slower but with increased power.

If, now, the key-block F is inserted, we have a direct engine-driven capstan in which all the above changes can be effected, and the capstan, under all these various conditions, driven by the engines A A; and when the shaft G is placed horizontally, a direct engine-driven windlass, in which the barrel or wildcat, one or more of them, are driven by the engines A A through the worm and worm-gear.

The various changes are effected by the key-blocks, which are at all times accessible, easily handled, not liable to get fast, bend, nor get out of order.

The friction-brake is very powerful, as two eccentric-lever blocks, O O, are secured, one to each end of the friction-strap, and operated by a handspike. Either or both can, therefore, be used to control the wild-cat or barrel.

Having thus described our invention, we claim as new and desire to secure by Letters Patent—

1. The combination, with the shaft of a capstan or windlass, provided with a worm-gear loosely applied, and adapted to be locked to said shaft, of a worm connected with and driven by one or more steam-engines, substantially as set forth.

2. The combination, with the shaft of a capstan or windlass, provided with a worm-gear, of a worm directly secured to the crank-shaft of one or more engines, and means for connecting or disconnecting the driving mechanism and the capstan or windlass-shaft, substantially as set forth.

3. The combination, with the shaft of a windlass or capstan, having a driving-head rigidly secured thereto, of a worm-gear adapted to be locked to said driving-head, and a worm attached to the crank-shaft of one or more engines, substantially as set forth.

4. The combination, with the shaft of a windlass or capstan, provided with one or more barrels and wild-cats, and means for connecting and disconnecting said parts to the shaft independently of each other, of a worm-gear attached to the shaft, a worm secured to a crank-shaft which is driven by one or more engines, and means for throwing the engines out of connection with the windlass-shaft, substantially as set forth.

5. A capstan, consisting of a central shaft driven by engine-power, having a driving-gear and capstan-head secured to said shaft, and a barrel and wild-cat revolving freely around said central shaft when both together, or each separately can be locked so as to revolve with the shaft, substantially as and for the purpose herein described.

6. In a power-capstan, the toothed rim H′ and sleeve Z, made in one piece or secured together and to the disk-plate Y, and provided with locking-sockets by which the barrel and wild-cat, either or both, may be locked to and turn with the sleeve Z and the driving-shaft, as and for the purpose set forth.

7. In combination with a capstan or windlass, the friction-strap N, when both ends of the strap are connected to levers, so that either or both may be operated as described.

JOS. P. MANTON.
GEO. H. REMINGTON.

Witnesses:
JOSEPH A. MILLER,
JOSEPH A. MILLER, Jr.